United States Patent [19]

Stirling

[11] Patent Number: 5,617,330
[45] Date of Patent: Apr. 1, 1997

[54] LOCAL COMMUNICATION SYSTEM AND STATION FOR USE IN SUCH A SYSTEM

[75] Inventor: Andrew J. Stirling, Epsom Downs, England

[73] Assignee: D2B Systems Company Limited, Redhill, England

[21] Appl. No.: 353,043

[22] Filed: Dec. 9, 1994

[30] Foreign Application Priority Data

Dec. 10, 1993 [GB] United Kingdom .................... 9325299

[51] Int. Cl.$^6$ ................................................. G01R 13/00
[52] U.S. Cl. ....................................... 364/514 A; 395/501
[58] Field of Search ............................... 364/514 C, 401, 364/514 A; 348/10, 17; 395/144, 148, 155, 156, 162, 200, 143; 345/118, 149, 98

[56] References Cited

U.S. PATENT DOCUMENTS

| | | |
|---|---|---|
| 4,288,809 | 9/1981 | Yabe .......................................... 358/12 |
| 5,305,195 | 4/1994 | Murphy ..................................... 364/401 |

FOREIGN PATENT DOCUMENTS

| | | |
|---|---|---|
| 0369382 | 5/1990 | European Pat. Off. ........ H04L 12/28 |
| 0505006 | 9/1992 | United Kingdom . |
| 0535749 | 4/1993 | United Kingdom . |

*Primary Examiner*—Emanuel T. Voeltz
*Assistant Examiner*—Thomas Peeso
*Attorney, Agent, or Firm*—Anne E. Barschall

[57] ABSTRACT

A local communication system has a number of stations connected for the communication of messages by one or more data channels. One of the stations comprises a display device operable to display messages (M1, M2) sent by other stations in one or more of a plurality of fields (F1, F2, F3). On receipt of a display command and message the user output subdevice of the display ascertains whether there are sufficient display fields available to display the entire message and, if so, allocates display fields to the message. Messages from two or more stations may be displayed simultaneously if there are sufficient available fields, with the user output subdevice allocating an appropriate number of fields to each message.

19 Claims, 3 Drawing Sheets

LOCAL COMMUNICATION SYSTEM AND STATION FOR USE IN SUCH A SYSTEM

The invention relates to a local communications system, and to a device for use in such a system. In particular the present invention relates to a local communications system comprising a plurality of devices interconnected for the communication of messages via one or more data channels, each device includes at least one functional subdevice element. The subdevices in the system include a user output subdevice for displaying user-readable messages to a user of the system. A user-readable message is determined by status information of a device, composed into a user-readable message by the subdevice element of that device, and transmitted directly or indirectly to the user output subdevice for display.

Examples of a local communication system of the type set forth in the opening paragraph are described in our European patent applications EP-A-0505006 (PHQ91010) and EP-A-0535749 (PHQ 91036).

A problem with existing systems is that a device or station wishing to send a message for display must first request display in order to determine whether the display device can handle the message and then, having confirmed that display is possible, send the message for display.

It is an object of the present invention to avoid this problem and provide for simplified design of message originating subdevices.

According to the present invention there is provided a system as set forth in the opening paragraph characterised in that the user output subdevice is operable to display messages in one or more of a plurality of fields, and to assign one or more display fields to a received message independently of the originating subdevice of that message.

Rather than an originating subdevice having to ascertain which, if any, display fields are free, a display message may be sent as a simple command (without a prior status request) with the display subdevice selecting fields for display. Preferably a message for display includes an indication of its length (suitably at or close to the start of the message) to enable the display subdevice to rapidly ascertain whether there are sufficient free fields in the display to accommodate the message in its entirety. Whether by detection of message length indicators or otherwise, the user output subdevice may be operable to display two or more messages simultaneously if it determines that there are sufficient free fields to do so. In order to avoid partial overwriting of a displayed message by a subsequently received, but shorter, message, the user output subdevice may suitably be configured to treat each message as indivisible, regardless of its length, such that a subsequent message will replace it rather than overwrite. To achieve this, whilst allowing for transmission constraints, subdevices composing messages requiring two or more fields for display may include one or more field separators in a transmitted message dividing the user-readable message into separate portions, with the user output subdevice detecting the or each field separator and displaying the successive portions in successive fields. Where field separators are used, the complete message may be transmitted as a series of discrete message portions with the first containing an indication of the total message length. Where an originating subdevice does not include field separators, but sends messages requiring more than one display field, the user output subdevice may be configured to determine the number of fields required and to split the message into separate fields. The split may suitably be made at a space character within the message to avoid dividing words between fields. This feature may be provided even though field separators are included to enable the use of display devices supporting a first display field length with originating subdevices supporting a second, longer, field length.

By configuring the user output subdevice to refuse to display messages from other subdevices when a received message has indicated that subsequent message portions are to follow, the user output subdevice may be effectively locked to an originating subdevice without locking of data channels which may be required for communication between other subdevices.

As a further improvement over existing systems, the user-readable messages may be assigned a display lifetime and, independently of the originating subdevice of a message, the user display subdevice would time message lifetimes and remove message from display at the end of their lifetime. The use of lifetimes, which may be assigned by the originating subdevice and indicated in the first field of a message or commonly assigned to all messages regardless of origin by the user output subdevice, allows simplification of originating subdevices which would no longer be required to time their own messages and issue requests for removal of messages at the end of their lifetime.

The invention further provides a display device operable to display messages and operable to assign one or more display fields in the manner of the user output subdevice in the system hereinbefore described. Further aspects and features of the invention will become apparent from reading the following description and claims.

Embodiments of the invention will now be described, by way of example, with reference to the accompanying drawings, in which.

Figure 1:
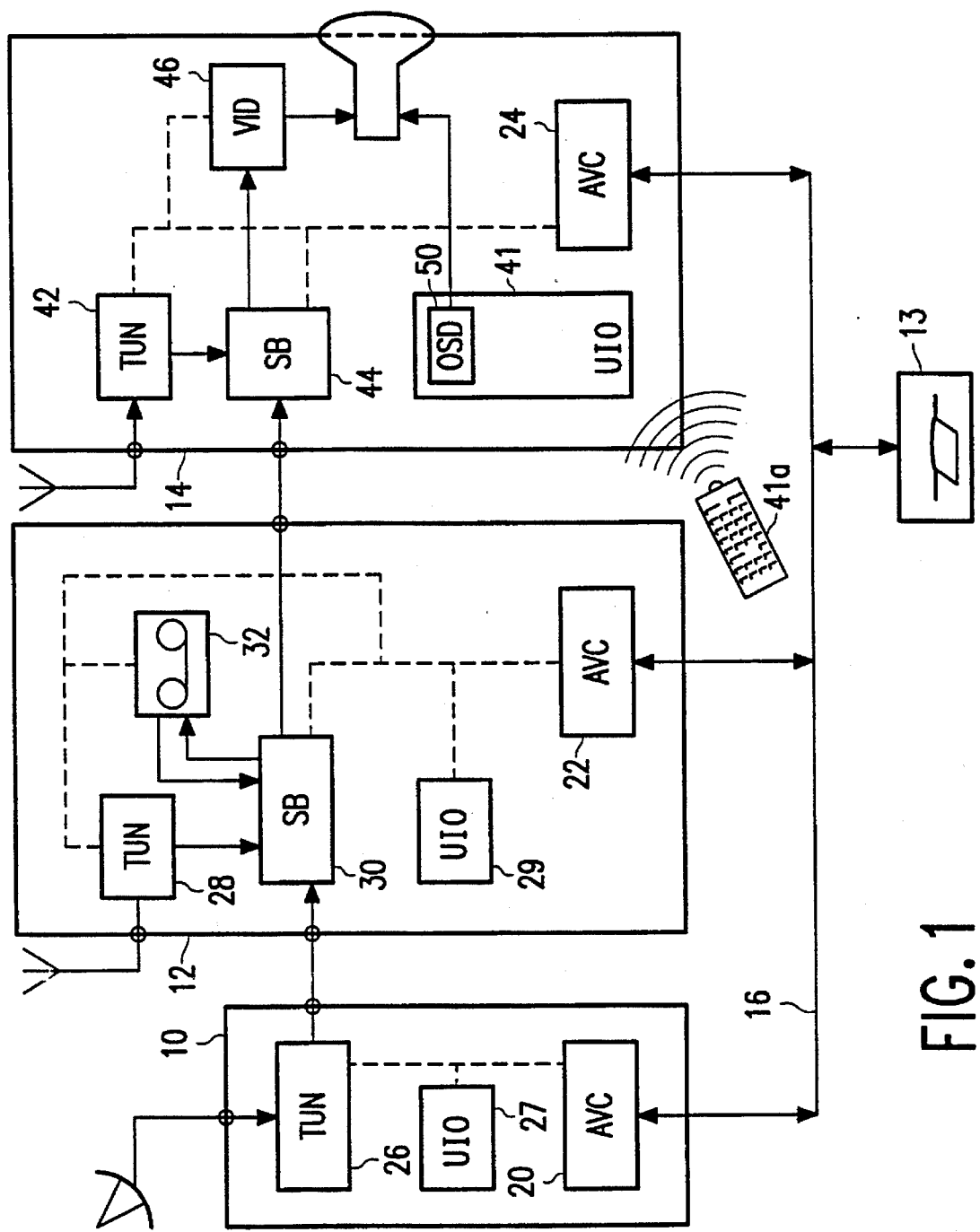
FIG. 1 shows a domestic audio/video system embodying the invention.

FIG. 1 shows a domestic video entertainment system comprising a satellite broadcast tuner 10, a video cassette recorder (VCR) 12, a smart card reader 13, and a television receiver 14, all connected to a serial data bus 16. Video and audio signals are passed within and between the devices 10, 12, and 14 using, for example, SCART (Euroconnector) plugs, sockets and multiwire cables.

The serial data bus provides for distributed control of the bus, and allows commands and other messages to be uniquely addressed for specific "devices", such as the apparatuses 10, 12, 13 and 14, and also for specific "subdevices" within each device.

Within each of devices 10, 12 and 14 there are shown blocks representing subdevices. The division of a device into subdevices is necessary only in a logical sense, that is to say, from the point of view of its behaviour relative to the serial bus 16. In the physical implementation of the device, there may or may not be corresponding separate physical subdevices. In fact, in the embodiment shown, each device includes one audio/video controller (AVC) type of subdevice which provides the control and systematic interrogation intelligence for all subdevices within that device, relaying system messages to and from those subdevices as indicated by the dotted data paths in FIG. 1. The AVC subdevices also provide the (distributed) controlling logic of the system as a whole, interpreting user commands and controlling the operation of the system accordingly. Often, the control logic of the AVC and some or all of the other subdevices will be integrated using a single programmed microcontroller. Other subdevices not shown in FIG. 1 will generally be included in such a system, including timers, audio amplifiers, and so forth, and the subdevices described herein are presented as a representative sample only.

In the satellite tuner device 10, a tuner subdevice 26 (TUN) performs the signal processing functions necessary to provide baseband video signals to the connected devices. The AVC subdevice 20 receives user instructions from a user input/output (User I/O) subdevice 27 (UIO) (the front panel and/or remote control of the satellite tuner) and system messages from the bus 16, and operates to select channels, keep track of preset channel selections and so forth.

The VCR device 12 includes its AVC subdevice 22, and also a User I/O subdevice 29 (UIO), a terrestrial broadcast tuner subdevice 28 (TUN), a switchbox subdevice 30 (SB) and a videotape record/replay deck 32.

The television receiver device 14 includes its AVC subdevice 24 and also a user input/output subdevice 41 (UIO), a terrestrial tuner subdevice 42 (TUN), a switchbox subdevice 44 (SB) and a video monitor subdevice 46 (VID). The User I/O subdevice 41 of the television receiver includes an on-screen display (OSD) function 50, as described hereinafter, and a remote control 41a for the receipt of user control signals.

In operation, the tuner subdevices 26,28 and 42 can be regarded as sources of video signals within the system. The video monitor subdevice 46 can act as a destination for video signals, and functions to display images to the user. The record/replay deck subdevice 32 can act as a source and/or a destination of video signals, depending on whether it is playing and/or recording at a given time.

Since the functional elements within the devices 10,12, 14 are addressable as system subdevices, any of the AVC subdevices 20,22,24 can take control of the bus and address commands to those subdevices. This is done for example by an AVC subdevice which has been informed of a user command by a User I/O subdevice and requires control of subdevices at various points in the system to implement the user's wishes.

System message formats for controlling the basic functions of certain common subdevices are defined, while scope is left for defining not only new commands, but also request and reply messages that enable one system device or subdevice to interrogate another as to its properties and status. Each switchbox subdevice 30 and 44 can be controlled via the bus (or by its associated AVC subdevice) to connect its output signal path(s) to a specified one of its input signal paths. For example, if a user indicates to the television receiver device 14 that it is desired to watch a certain satellite broadcast channel, suitably addressed and coded system messages can be sent via the bus 16 to ensure that the satellite tuner 10, VCR 12, card reader 13 and the television 14 are active, to cause the satellite tuner 10 to select the appropriate channel, to cause the VCR switchbox subdevice 30 and the television switchbox subdevice 44 to connect the appropriate signal path from source to destination. There are many ways of arranging these events with or without user intervention. For greatest user-friendliness, the whole process can be controlled by the AVC subdevice of the device which receives the user input. The information necessary for building the signal path from source to destination can be obtained by a suitable series of system request messages to the relevant devices and subdevices.

In order to provide a user-friendly user interface for the system, any AVC subdevice (hereinafter "AVC") may wish to display user messages using the on-screen display (OSD) facility 50 of the User I/O subdevice 41. For example, when the television is activated by a user and a signal path set up according to the user's wishes, the AVC 24 may wish to confirm visually for the user which channel is being watched.

Figure 2:
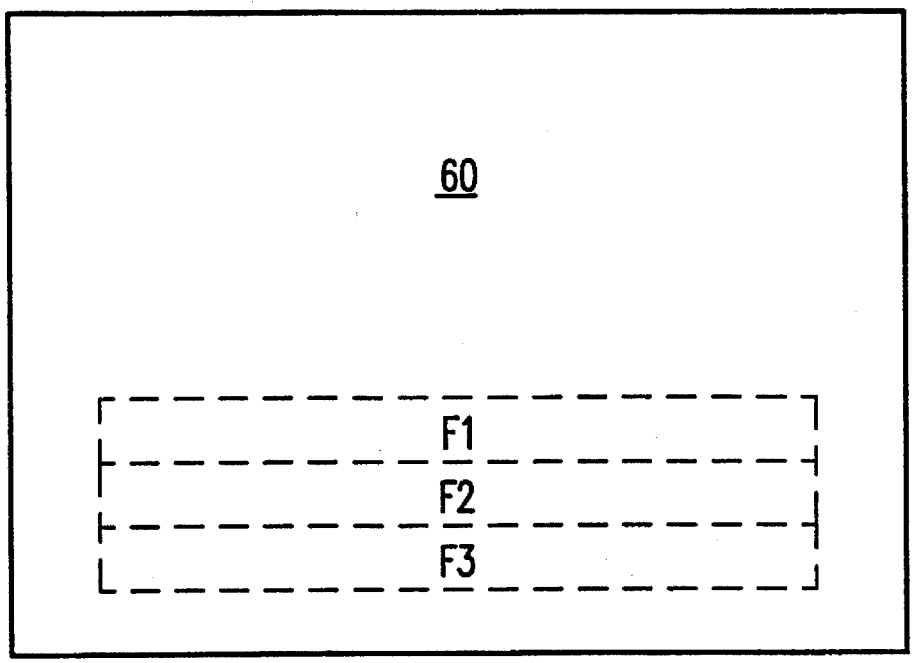
FIGS. 2 and 3 represent the positioning of message fields on a display.
Figure 3:
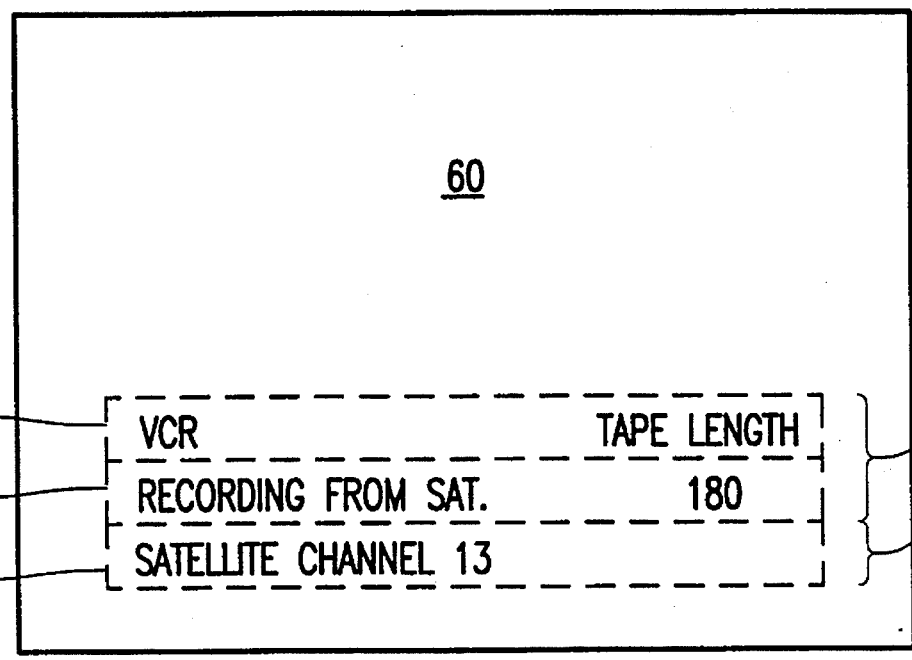

FIG. 2 shows a screen space 60 having three display fields F1, F2, F3 available: these are positioned near the bottom of the display to minimise the obscuring of television pictures. As shown in FIG. 3, a message M 1 (in this case a status message from AVC 22 of the video recorder 12) may occupy more than one field F1,F2 as will be described hereinafter. As will also be described, if there are sufficient free fields, two or more messages may be displayed simultaneously, as shown by message M2 (from AVC 20 of satellite tuner 10) appearing in display field F3.

The control and operation of the OSD is determined by protocols for the dialogue language command, the OSD data and OSD status requests.

Figure 4:
FIGS. 4 to 8 illustrate on-screen-display control functions used in the system of FIG. 1.

The dialogue language command may be used to select the language and character set to be used by a device receiving the command for generating OSD messages and is in the format of an operating code (OPC) identifying a device language command followed by a first operand (OPR1) indicating the language and character set, as shown in FIG. 4.

Figure 5:
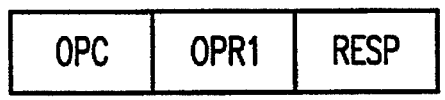

The response is in the format of the dialogue language command followed by a response code (Resp) as shown in FIG. 5. The response code may take one of four values, namely "not implemented", "reject", "busy" or "completed".

The response code 'not implemented' indicates that the device does not support this command or the specified operands. Response code 'reject' indicates that, whilst the device is generally able to execute the received command, it is unable to do so on this occasion due either to the same or another device command/request being received or the current state of the device preventing execution (for example the device is inactive or is in an emergency state). The originating subdevice receiving a 'reject' message is preferably suitably configured to determine whether the OSD message may be abandoned or should be resent after a short interval of, for example, 0.1 to 3.0 seconds. Response code 'busy' indicates that the device has received and is processing the command but the final response (either 'reject' or 'completed') is at present unknown: the final response will be sent on completion of processing. Response code "completed" indicates that the command was executed as specified, that is to say the language and character set specified in the dialogue language command has been selected.

Figure 6:
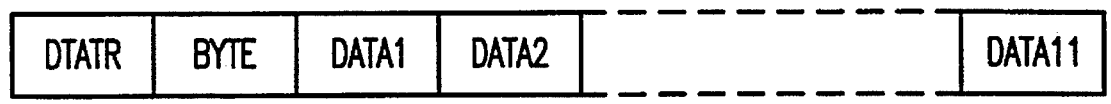

This OSD data protocol defines the format of the display data transmitted. Data is transmitted in frames, the general format of which is as shown in FIG. 6, with single frame messages or the first frame of a multiple frame sequence carrying additional information to further frames as described below. When data is transmitted in a multiple frame sequence, locking is used to maintain the path from originating to destination device (the user output subdevice). The first frame locks the destination and the final frame unlocks it: a maximum number of frames (4 is preferred) is specified for a locked sequence. When a message needs to be displayed in multiple lines on the television screen, each line is sent as a separate frame sequence. When Japanese data is being transmitted, where each character requires 2 bytes of definition, care must be taken not to split any 2 byte character code between successive frames.

Preferably a timeout provision is made for locking whereby, if no message portion (frame) is received by the user output subdevice for a predetermined period when locked, the lock is removed and messages from other subdevices may then be accepted.

As shown in FIG. 6, all frames are made up of 13 bytes. The first byte (DTATR) indicates whether the OSD is European/American (requiring 1 byte per character) or Japanese (two bytes per character), whilst the second (BYTE) indicates the number of DATA bytes following. The following DATA bytes (DATA1 to DATA11) specify the OSD data to be displayed, although in the first frame of a frame sequence only 8 character data bytes are available (DATA4 to DATA11), with the remaining bytes (DATA1 to DATA3) carrying control information relating respectively to the language and character set, the message mode, and the line sequence.

The byte for language and character set (DATA1) indicates the chosen character set and language, the code being as for QPR1 in the dialog language command. The mode byte (DATA2) indicates the importance of the message as follows:

| | |
|---|---|
| Normal: | a normal message such as 'Play' sent from a VCR to indicate that a cassette is being played. |
| Important: | an important message such as 'No Cassette' sent from a VCR when instructed to play or record and no cassette is present in the record/replay deck. |
| Alert: | a warning message, such as 'Emergency'. |

The line sequence byte (DATA3) provides one of two indications, depending on whether the frame is the first frame in the first line of a single or multiple line message, or whether the frame is the first frame in a subsequent line of a multiple line message. In the first line of a single or multiple line message, this byte indicates the total number of lines in the message, that is to say the number of frame sequences which will need to be received before the message is complete. In the first frame of a second or subsequent line of a multiple line message, the DATA3 byte may carry other data.

Figure 7:
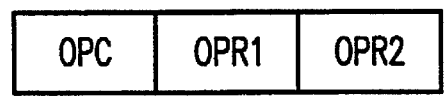
Figure 8:
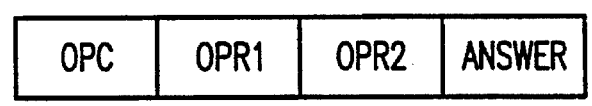

The OSD status request is sent from a device to a display subdevice to obtain information about the OSD function. The request format is as shown in FIG. 7 with an operating code byte OPC indicating a video status request, followed by two operand bytes OPR1 and OPR2. The response format is as shown in FIG. 8.

The response to the OSD status request includes an Answer byte indicating 'not implemented', 'reject' or 'completed'. An answer of 'not implemented' indicates that the display subdevice does not support the request or the option specified. An answer of 'reject' indicates that the display subdevice has the ability to execute the received request but is unable to do so on the present occasion due either to the same or another display subdevice command/request being received or the current state of the display device prevents execution (for example the display is inactive or is in an emergency state).

A 'completed' answer comprises a repeat of the video status request byte OPC, the two operands OPR1 and OPR2 respectively representing language/character set and level, and an Answer byte indicating completion, that is to say the subdevice is currently in the state specified by the operands. The language/character set byte OPR1 indicates that the display subdevice will display OSD data in the language and character set specified. The level byte OPR2 indicates the OSD level supported by the display device as shown in Table 1 below:

TABLE 1

| Level | Display device |
|---|---|
| 1st | Displays all modes (Normal, Important and Alert) in the same format. |
| 2nd | Supports separate formats for Normal and Important modes. Alert messages displayed in the same format as Important. |
| 3rd | Displays all modes in different formats. |

In order to simplify the operation of devices generating messages for display, the user output subdevice (the OSD function 50; FIG. 1) is given greater control of display than has heretofore been provided in, for example, the system of EPA-0505006 (PHQ 91010) referred to earlier.

All OSD messages are given a display lifetime (suitably of at least four seconds) by the OSD function which handles the timing and removal of messages at the end of their lifetime. This removes the responsibility from each subdevice sending a message to be displayed for timing the display and subsequently sending a further message to the OSD function requesting removal of the message. As will be appreciated, this also reduces the number of messages on the interconnecting bus system. Should an originating subdevice wish to maintain a message on screen for longer than its specified lifetime, it is required to reissue the display instructions within the original lifetime.

Setting of the display lifetime may be made dependent on the message mode set by the originating device and indicated in the DATA2 data bit in the message (FIG. 6). Alternatively, to reduce complexity in the OSD function, the OSD function may assign a fixed lifetime to all received messages regardless of the mole set by their originating device.

In order to reduce conflicts, which may occur when a first message is being displayed and a second message is received by the display subdevice, the display subdevice manages the OSD messages in accordance with the following conditions:

the display subdevice treats each message as a single object, rather than as a set of separate lines to ensure that the display remains free from parts of previous messages and avoids the possibility of messages becoming mixed on screen;

accepts a command to display a message and determines whether display is possible depending on the size of the message and availability of display fields. An acknowledge message may then be transmitted to the originating subdevice indicating whether the message has been displayed;

a received OSD message will overwrite (that is to say completely replace) a previous message unless the display function determines that there are sufficient available display fields for the simultaneous display of both messages;

only one message at a time may be displayed per originating device or subdevice.

The above conditions, as implemented by the display subdevice, have advantages for the originating devices in that they are not required to search for free lines on the display, nor are they required to consider options supported by individual lines of the display, and they can send messages directly to the display subdevice without the prior step of issuing requests. An advantage to the user is that no partially overwritten messages can appear on the display.

From reading the present disclosure, other modifications will be apparent to persons skilled in the art. Such modifications may involve other features which are already known in the design, manufacture and use of local communication bus systems, domestic audio/video apparatuses and component parts thereof and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A local communication system comprising a plurality of devices interconnected for the communication of messages via one or more data channels, each device including at least one functional subdevice element, the subdevices in the system including a user output subdevice for displaying user-readable messages to a user of the system, a user-readable message being determined by status information of a device, composed into a user-readable message by the subdevice element of that device, and transmitted directly or indirectly to the user output subdevice for display, characterised in that the user output subdevice is operable to display messages in one or more of a plurality of fields and to assign one or more display fields to a received message independently of the originating subdevice of that message.

2. A system according to claim 1, wherein the user output subdevice is operable to determine the length of a received message and decide whether or not to display the message in dependence on whether or not there are sufficient free fields to do so.

3. A system according to claim 2, wherein a subdevice composing display messages requiring two or more display fields includes field separators in a transmitted message, and the user output subdevice determines the length of a received message by counting the field separators therein.

4. A system according to claim 2, wherein a subdevice composing display messages includes in the message data an indication of its length.

5. A system according to claim 4, wherein an originating subdevice sends a message as a plurality of message portions, the first of which carries the message length indicator, and the user output subdevice is configured to refuse to accept messages from other subdevices until all of the said message portions have been received.

6. A system according to claim 2, wherein the user output subdevice is operable to display two or more messages simultaneously if it determines that there are sufficient free fields to do so.

7. A system according to claim 1, wherein the user output subdevice sends an acknowledgement message to an originating subdevice indicating whether or not a display message therefrom has been displayed.

8. A system according to claim 7 wherein, if a received display message has not been displayed, the acknowledgement message includes a code indicating why display has not occurred and the originating subdevice receiving the acknowledgement message is operable to decide on the basis of the included code whether or not to retransmit the display message.

9. A system according to claim 1, wherein each user readable message is assigned a display lifetime and, independently of the originating subdevice of a message, the user output subdevice times the message lifetime and removes the message from display on its expiry.

10. System according to claim 1 wherein the output sub-device is a screen and each display field has a respective fixed location where messages are shown on the screen.

11. System according to claim 1 wherein any message may be assigned to any of the one or more display fields.

12. System according to claim 10 wherein each display field is restricted to a single line of text on the screen.

13. A device for use in a communication system the device comprising:

means for communicating messages via at least one data channel to other similar devices;

a subdevice element for composing user-readable messages;

a display subdevice for assigning messages to at least one display field independently of the origin of the messages and for displaying the messages in the display field, each display field having a respective fixed location within the display.

14. Device according to claim 13 wherein the display subdevice determines the length of a received message and decides whether or not to display the message according to whether or not there are sufficient free fields to do so.

15. Device according to claim 14, wherein the subdevice element composing display messages requiring two or more display field includes field separators in a transmitted message, and the display subdevice determines the length of the received message by counting the field separators therein.

16. Device according to claim 14, wherein the subdevice element includes in the message data an indication of message length.

17. Device according to claim 16 wherein an originating subdevice sends messages as a plurality of message portions, the first of which carries the message length indicator, and the display subdevice is configured to refuse to accept messages from other subdevices until all of the message portions have been received.

18. Device according to claim 14, wherein the display subdevice is operable to display two or more messages simultaneously if it determines that there are sufficient free fields to do so.

19. Device according to claim 13, wherein each user readable message is assigned a display lifetime, and independently of the originating subdevice of a message, the user output subdevice times the message lifetime and removes the message from display on its expiry.

* * * * *